Nov. 15, 1938.  F. A. NODINE  2,137,094
TEMPERATURE INDICATING MEANS FOR CULINARY VESSEL CLOSURE
Filed Dec. 9, 1937
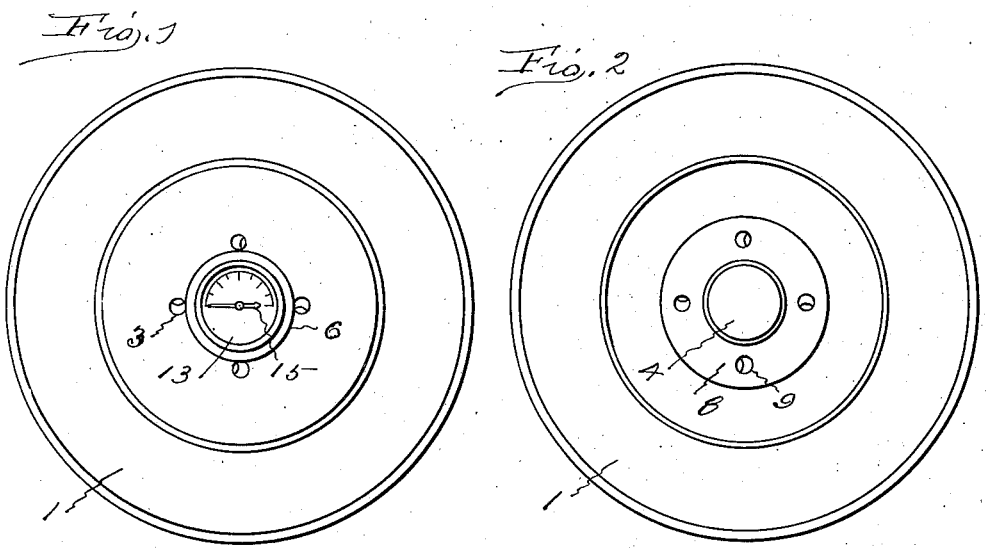
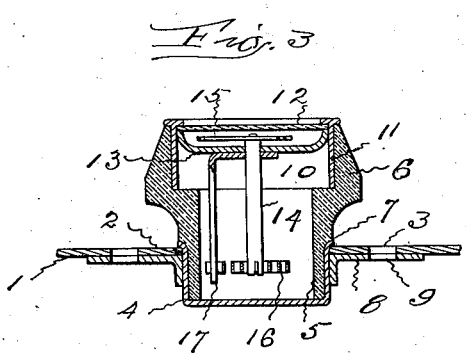
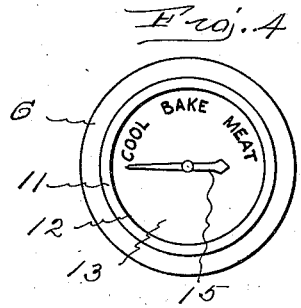
INVENTOR
Frederick A. Nodine
by Harry P. Williams
atty.

Patented Nov. 15, 1938

2,137,094

UNITED STATES PATENT OFFICE 2,137,094

TEMPERATURE INDICATING MEANS FOR CULINARY VESSEL CLOSURE

Frederick A. Nodine, Terryville, Conn., assignor to The Cooper Oven Thermometer Company, Pequabuck, Conn., a corporation of Connecticut Application December 9, 1937, Serial No. 178,887

1 Claim. (Cl. 73—343)

This invention relates to closures for pots, pans, kettles and the like in which food is cooked, and more particularly to those closures which are supplied with ventilators, by means of which the escape of steam, vapors and gas generated during cooking may be controlled, and also supplied with means whereby the temperature of the interior of the vessel to which the closure is applied may be indicated.

The object of the invention is to provide a closure for culinary vessels which is attractive in appearance and which has combined in a simple unitary structure means for handling the closure, means whereby the temperature in the vessel to which the closure is applied may be conveniently observed, and means for ventilating the closure as seems desirable at the temperature indicated.

In accomplishing this object the closure shown has a perforation at its center, a hollow knob rotatably mounted in the perforation, temperature responsive and indicating means located in the knob, and a ventilating disk connected to and rotatable with the knob, in such relations that the interior temperature may be read by a glance at the front of the knob, the ventilator adjusted by turning the knob, and the knob employed to place the closure on or to remove the closure from a vessel.

In the accompanying drawing which illustrates an embodiment of the invention, Fig. 1 shows a view of the front of a ventilated closure that has a knob for handling the closure, for adjusting the ventilator, and for containing the temperature indicating means.

Fig. 2 is a view of the back of the closure.

Fig. 3 shows on larger scale a central section of the hollow handle knob and the manner of its connection to a closure and ventilator.

Fig. 4 shows an enlarged front view of the handle knob and contained temperature indicating means.

The closure 1 may have any desired contour or configuration, that shown being circular, and it may be made of any desired material, preferably sheet metal suitably finished. Through the center of the closure is a perforation 2, and in the construction shown each side of the center there are ventilating holes 3.

A cup 4 preferably formed of sheet metal is rotatably mounted in the perforation through the closure with its closed end on the inner side, and inserted into this cup and fastened thereto by any suitable means is the shank 5 of the hollow knob or handle 6. This knob may be made in any approved shape of any desired material, such as porcelain or Bakelite, preferably the latter. At the inner end of the shank of the knob is an exterior shoulder 7 which rests upon the outer edge of the cup. Attached to the cup inside of the closure so as to rotate with the cup is a ventilating disk 8 that has holes 9 adapted to cooperate with the holes 3 through the closure for obtaining the desired ventilation. The knob and cup are thus rotatably retained in the perforation in the closure by the shoulder 7 on the outside and the ventilating disk 8 on the inside of the closure.

In the recess 10 in the knob is located a casing 11 with a window closed by a glass or transparent cellulose disk 12. In the casing back of the window is a dial plate 13. The dial plate is marked with graduations or notations which may vary according to choice, for example, they may denote temperature such as cool, medium and hot, or they may designate function such as bake, fry and boil, or signify the materials to be cooked, such as bread, vegetables and meat.

Supported by the dial plate is a rotatable spindle 14. Attached to the end of the spindle between the dial plate and the window is a pointer 15, and attached to the other end of the spindle near the bottom of the recess in the knob shank, is a thermo-responsive coil 16, one end of the coil being attached to the spindle and the other end to an arm 17 which is secured to and extends inward from the back of the dial plate.

With the construction described, upon noting the temperature the knob, which affords a handle for the closure as well as the ventilator, and casing for the thermometer, may be turned to cause such relation of the vents in the closure and vents in the ventilator disk that the required ventilation to produce the desired cooking result may be obtained. The temperature indicating means is so located that it responds quickly and efficiently to the temperature variations in the vessel to which the closure is applied, and the active thermal elements are completely encased and thoroughly protected from the effects of steam, hot vapor and gases by the cup and knob in which they are located.

The invention claimed is:—

The combination with a culinary vessel cover having a central perforation, of a metallic cup rotatably fitted in and extending through said perforation, said cup having its closed end inside of the cover and its open end outside of the cover, and a knob of low heat conductivity having an axial opening therethrough with its inner open end fixed in said cup and a transparent closure fixed in its outer end, temperature indicating means disposed in said knob with its actuating means near the bottom of the cup and its indicating means visible through the transparent closure.

FREDERICK A. NODINE.